United States Patent
Lee et al.

(10) Patent No.: US 8,846,234 B2
(45) Date of Patent: *Sep. 30, 2014

(54) BATTERY CARTRIDGE HAVING ELASTIC PRESSING MEMBER, AND BATTERY MODULE CONTAINING THE SAME

(75) Inventors: Jin Kyu Lee, Busan (KR); Hee Soo Yoon, Daejeon (KR); BumHyun Lee, Seoul (KR); Dal Mo Kang, Daejeon (KR); Jaeseong Yeo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/332,118

(22) Filed: Dec. 20, 2011

(65) Prior Publication Data

US 2012/0088141 A1    Apr. 12, 2012

Related U.S. Application Data

(63) Continuation of application No. 12/858,119, filed on Aug. 17, 2010, now Pat. No. 8,114,539, which is a continuation of application No. PCT/KR2010/002695, filed on Apr. 28, 2010.

(30) Foreign Application Priority Data

May 11, 2009  (KR) .................. 10-2009-0040884

(51) Int. Cl.
    *H01M 10/50*    (2006.01)
(52) U.S. Cl.
    USPC ....................................... 429/120
(58) Field of Classification Search
    USPC ....................................... 429/120
    See application file for complete search history.

(56) References Cited

U.S. PATENT DOCUMENTS

| | | | |
|---|---|---|---|
| 6,821,671 B2 | 11/2004 | Hinton et al. | |
| 2005/0042511 A1 | 2/2005 | Kaneta | |
| 2005/0089751 A1 | 4/2005 | Oogami et al. | |
| 2005/0208375 A1* | 9/2005 | Sakurai | 429/162 |
| 2006/0183017 A1 | 8/2006 | Kanai | |
| 2006/0286450 A1* | 12/2006 | Yoon et al. | 429/180 |
| 2008/0090137 A1* | 4/2008 | Buck et al. | 429/120 |
| 2008/0299452 A1 | 12/2008 | Nakazawa | |
| 2009/0297936 A1 | 12/2009 | Nemoto et al. | |
| 2010/0178553 A1* | 7/2010 | Murata | 429/179 |
| 2010/0273042 A1* | 10/2010 | Buck et al. | 429/120 |

FOREIGN PATENT DOCUMENTS

| | | |
|---|---|---|
| EP | 2 343 754 A2 | 7/2011 |
| EP | 2 416 439 A2 | 2/2012 |
| EP | 2 479 835 A2 | 7/2012 |
| EP | 2 479 836 A2 | 7/2012 |
| JP | 8-148187 A | 6/1996 |

(Continued)

*Primary Examiner* — Ula C Ruddock
*Assistant Examiner* — Frank Chernow
(74) *Attorney, Agent, or Firm* — Birch, Stewart, Kolasch & Birch, LLP

(57) ABSTRACT

Disclosed herein is a battery cartridge configured in a frame structure to mount a plate-shaped battery cell therein, the battery cartridge comprising a pair of plate-shaped frames configured to fix the outer circumference of the battery cell in a state in which at least one side of the battery cell is open, wherein each of the frames is provided at the outside thereof with an elastic pressing member configured to fix a heat dissipation member to the open side of the battery cell in a tight contact manner upon manufacture of a battery module.

21 Claims, 5 Drawing Sheets

(56) References Cited

FOREIGN PATENT DOCUMENTS

| | | |
|---|---|---|
| JP | 08-321329 | 12/1996 |
| JP | 2004-31281 A | 1/2004 |
| JP | 2005-116427 A | 4/2005 |
| JP | 2008-103239 A | 5/2008 |
| JP | 2008-159328 A | 7/2008 |
| JP | 2008-235170 A | 10/2008 |
| JP | 2009-517833 A | 4/2009 |
| KR | 10-2007-0101025 A | 10/2007 |
| KR | 10-2008-0042965 A | 5/2008 |
| WO | WO 2008/007767 A1 | 1/2008 |

\* cited by examiner

700

BATTERY CARTRIDGE HAVING ELASTIC PRESSING MEMBER, AND BATTERY MODULE CONTAINING THE SAME

This application is a Continuation of application Ser. No. 12/858,119 filed on Aug. 17, 2010, now U.S. Pat. No. 8,114,539, which is a Continuation of PCT International application No. PCT/KR2010/002695 filed on Apr. 28, 2010, which claims the benefit of Patent Application No. 10-2009-0040884 filed in Republic of Korea, on May 11, 2009. The entire contents of all of the above applications is hereby incorporated by reference into the present application.

TECHNICAL FIELD

The present invention relates to a battery cartridge having an elastic pressing member and a battery module including the battery cartridge, and, more particularly, to a battery cartridge configured in a frame structure to mount a plate-shaped battery cell therein, the battery cartridge comprising a pair of plate-shaped frames configured to fix the outer circumference of the battery cell in a state in which at least one side of the battery cell is open, wherein each of the frames is provided at the outside thereof with an elastic pressing member configured to fix a heat dissipation member to the open side of the battery cell in a tight contact manner upon manufacture of a battery module and a battery module configured in a structure in which a battery cell is mounted in the battery cartridge.

BACKGROUND ART

As mobile devices have been increasingly developed, and the demand for such mobile devices has increased, the demand for secondary batteries has also sharply increased. Among such secondary batteries is a lithium secondary battery having high energy density and operating voltage and excellent preservation and service-life characteristics, which has been widely used as an energy source for various electronic products as well as for the mobile devices.

Based on their external and internal structures, secondary batteries are generally classified into a cylindrical battery, a prismatic battery, and a pouch-shaped battery. Especially, the prismatic battery and the pouch-shaped battery, which can be stacked with high integration and have a small width to length ratio, have attracted considerable attention.

Also, the secondary batteries have attracted considerable attention as an energy source for electric vehicles, hybrid electric vehicles, and plug-in hybrid electric vehicles, which have been developed to solve problems, such as air pollution, caused by existing gasoline and diesel vehicles using fossil fuel. As a result, the secondary batteries are being applied to an increasing number of applications owing to advantages thereof, and, in the future, the secondary batteries are expected to be applied to even more applications and products.

As applications and products, to which the secondary batteries are applicable, are increased, kinds of batteries are also increased such that the batteries can provide powers and capacities corresponding to the various applications and products. Furthermore, there is a strong need to reduce the size and weight of the batteries applied to the corresponding applications and products.

For example, small-sized mobile devices, such as mobile phones, personal digital assistants (PDA), digital cameras, and laptop computers, use one or several small-sized, lightweight battery cells for each device according to the reduction in size and weight of the corresponding products. On the other hand, middle- or large-sized devices, such as electric bicycles, electric motorcycles, electric vehicles, and hybrid electric vehicles, use a middle- or large-sized battery module (which may also be referred to as a "battery pack") having a plurality of battery cells electrically connected with each other because high power and large capacity is necessary for the middle- or large-sized devices. The size and weight of the battery module is directly related to an accommodation space and power of the corresponding middle- or large-sized device. For this reason, manufacturers are trying to manufacture small-sized, lightweight battery modules.

Meanwhile, when battery cells are connected to one another, in a state in which the battery cells are stacked, so as to increase the capacities of battery modules, the dissipation of heat from the battery cells becomes serious. For lithium secondary batteries, heat is generated from the lithium secondary batteries during the charge and discharge of the lithium secondary batteries. If the heat is not effectively removed from the lithium secondary batteries, the heat accumulates in the respective lithium secondary batteries, resulting in the deterioration of the lithium secondary batteries, and the safety of the lithium secondary batteries is greatly lowered. In particular, for a battery requiring high-speed charging and discharging characteristics as in a power source for electric vehicles and hybrid electric vehicles, a large amount of heat is generated from the battery when the battery instantaneously provides high power.

Also, a water cooling type cooling structure or an air cooling type cooling structure, which is widely used as a cooling structure for cooling such a battery module, is generally fixed to the battery module. As a result, it is difficult to apply various cooling structures to the battery module as needed.

In connection with this matter, for example, Japanese Patent Application Publication No. 2004-031281 discloses a cooling structure of an electrode stacked type battery configured in a structure in which a pair of laminate films each including a metal layer and a resin layer are disposed at opposite sides of an electrode assembly manufactured by stacking a cathode and an anode in a state in which a separator is disposed between the cathode and the anode, and edges of the laminate films are fixed to each other in a tight contact manner, wherein a pair of pushing members push opposite sides of the electrode stacked type battery, the pushing members protrude more outward than the outer circumference of the electrode stacked type battery, the protruding regions of the pushing members function as heat dissipation members which dissipate heat generated from the electrode stacked type battery.

However, the above-mentioned technology has problems in that it is necessary to manufacture a battery cell case in a complicated structure and mount the manufactured battery cell case into a battery, which is troublesome. Also, the above-mentioned technology is limited to a structure in which an air cooling type cooling fin is applied upon stacking of batteries to manufacture a battery module, with the result that it is difficult to use various heat dissipation members, such as a water cooling type cooling plate or a non plate-shaped cooling member.

Therefore, there is a high necessity for technology that is capable of fundamentally solving the above-mentioned problems.

DISCLOSURE

Technical Problem

Therefore, the present invention has been made to solve the above problems, and other technical problems that have yet to be resolved.

Specifically, it is an object of the present invention to provide a battery module configured in a structure in which the outer circumference of a battery cell is fixed by plate-shaped frames in a state in which sides of the battery cell are open, and elastic pressing member are mounted to the outsides of the frames such that various heat dissipation methods are applied to the battery module.

Technical Solution

In accordance with one aspect of the present invention, the above and other objects can be accomplished by the provision of a battery cartridge configured in a frame structure to mount a plate-shaped battery cell therein, the battery cartridge comprising a pair of plate-shaped frames configured to fix the outer circumference of the battery cell in a state in which at least one side of the battery cell is open, wherein each of the frames is provided at the outside thereof with an elastic pressing member configured to fix a heat dissipation member to the open side of the battery cell in a tight contact manner upon manufacture of a battery module.

Consequently, in a case in which a plurality of battery cartridges according to the present invention, in each of which a battery cell is mounted, are stacked in a state in which heat dissipation members are disposed between the respective battery cartridges, elastic pressing members increase structural stability of the battery cartridge stack and, in addition, enable the heat dissipation members to be effectively fixed to the battery cartridge stack.

Also, in the battery cartridge structure as described above, it is possible to apply various heat dissipation members to the battery cartridges based on thermal characteristics and use environment of the battery cells, thereby achieving joint use of a battery module.

Structure of the elastic pressing member is not particularly restricted as long as the elastic pressing member can be mounted to the frames to fix the heat dissipation member upon manufacture of a battery module. For example, the elastic pressing member may be mounted to at least one selected from a group consisting of an upper side region, a lower side region, a left side region, and a right side region of the outside of each of the frames. Preferably, the elastic pressing members are mounted to the upper side region and the lower side region of the outside of each of the frames and/or the left side region and the right side region of the outside of each of the frames.

Consequently, the heat dissipation member is pressed in a tight contact manner by the elastic pressing member mounted to the outside of each of the frames to increase fixation between the heat dissipation member and each of the frames. As a result, it is not necessary to use an additional member to fix the heat dissipation member.

As previously described, the plate-shaped frames may fix the outer circumference of the battery cell in a state in which at least one side of the battery cell is open, and the heat dissipation member may be disposed in tight contact with the open side of the battery cell. Consequently, heat generated from the battery cell is transferred to the heat dissipation member, thereby achieving effective heat dissipation. Preferably, the plate-shaped frames fix the outer circumference of the battery cell in a state in which the opposite sides of the battery cell are open, thereby maximizing heat dissipation efficiency.

In a preferred example, the battery cell may be mounted between the respective frames in a state in which the at least one open side of the battery cell protrudes from a corresponding one of the frames, and the elastic pressing member may be mounted at the outside of each of the frames in a state in which the elastic pressing member has a height greater than a protruding height of the battery cell at the at least one open side thereof.

In the above structure, the elastic pressing member mounted higher than the protruding open side of the battery cell is elastically pressed, when a plurality of battery cartridges, in each of which a battery cell is mounted, are stacked to constitute a battery module, thereby providing a stably stacked structure. In a case in which the heat dissipation members are disposed between the respective battery cartridges, the elastic pressing members assist the heat dissipation members to be stably mounted to the respective battery cartridges.

According to circumstances, the elastic pressing member may be provided at the outer surface thereof with at least one structure selected from a group consisting of a depressed part, an embossed part, and a groove.

A material for the elastic pressing member mounted at the outside of each of the frames is not particularly restricted as long as the elastic pressing member exhibits elastic compressive force when the elastic pressing member is pressed. Preferably, the elastic pressing member is made of a polymer resin exhibiting a physical property of elasticity. Such a polymer resin may be a material that is capable of exhibiting high elastic force or may have a structure or shape that is capable of exhibiting high elastic force. A representative example of the former may be rubber, and a representative example of the latter may be foamed polymer resin.

The elastic pressing members may be mounted to the frames in various manners. In order to more efficiently mount the elastic pressing members to the frames, each of the frames may be provided at the outside thereof with a groove, in which the elastic pressing member is mounted.

The elastic pressing member may have a width equivalent to 10 to 80% of a width of each of the frames. If the width of each of the elastic pressing members is too small as compared with the width of each of the frames, an effect obtained by mounting the elastic pressing members to the frames may be exhibited. On the other hand, if the width of each of the elastic pressing members is too large as compared with the width of each of the frames, the elastic pressing members, which are elastically deformed when the elastic pressing members are pressed, cover large portions of the heat dissipation members, with the result that a heat dissipation effect may be lowered. Furthermore, the elastic pressing members may protrude out of the frames when the elastic pressing members are pressed, which is not preferable. Of course, therefore, the width of each of the elastic pressing members may exceed the above defined range unless the above problems are caused.

The frames may be made of various materials. Preferably, the frames are made of an insulative material or a material upon which insulative surface treatment is carried out. A representative example of the former may be a plastic resin, and a representative example of the latter may be a metal material having an insulative material coated on the surface thereof. However, the material for the frames is not limited to the above materials.

The elastic pressing members, which increase structural stability of the battery cartridge stack and, in addition, enable the heat dissipation members to be effectively fixed to the battery cartridge stack when a plurality of battery cartridges according to the present invention, in each of which a battery cell is mounted, are stacked in a state in which heat dissipation members are disposed between the respective battery cartridges as described above, may be located on the heat dissipation members.

In accordance with another aspect of the present invention, therefore, there is provided a heat dissipation member configured to be mounted between battery cells or between battery cartridges having battery cells mounted therein, wherein the heat dissipation member is provided with an elastic pressing member configured to fix the heat dissipation member to an outside of each of the battery cells in a tight contact manner.

The elastic pressing member mounted at the heat dissipation member is substantially identical to the elastic pressing member mounted at the battery cartridge except where the elastic pressing member is mounted. Consequently, construction and operation related to the elastic pressing member mounted at the battery cartridge are identically applicable to the elastic pressing member mounted at the heat dissipation member.

Meanwhile, in a case in which a battery module having high power and/or large capacity is needed according to purpose of use, it is necessary to provide a structure in which a plurality of battery cells are stacked. In this case, a higher heat dissipation property is required to secure safety. In accordance with a further aspect of the present invention, therefore, there is provided a battery module configured in a structure in which battery cartridges are sequentially stacked in a state in which battery cells are mounted in the battery cartridges, and a heat dissipation member is disposed at at least one interface between the battery cartridges, thereby achieving effective dissipation of heat from the battery cells.

In the above structure, the heat dissipation member may be formed in the shape of a plate, and the heat dissipation member may be disposed between the battery cartridges in a state in which at least a portion of the heat dissipation member is exposed outward from the stacked battery cartridges. That is, at least a portion of the heat dissipation member is exposed outward from the battery cartridge stack, with the result that heat generated from the battery cells is transferred to the heat dissipation member disposed between the battery cartridges and is effectively removed through the portion of the heat dissipation member exposed outward from the battery cartridge stack. The portion of the heat dissipation member disposed between the stacked battery cartridges may have a size to completely cover the interface between the battery cartridges. Alternatively, the portion of the heat dissipation member disposed between the respective battery cartridges may have a size to partially cover the interface between the respective battery cartridges.

Structure of the heat dissipation member is not particularly restricted as long as the heat dissipation member is disposed between the respective battery cartridges in a state in which a portion of the heat dissipation member is exposed outward from the battery cartridges. For example, the heat dissipation member may be an air cooling type cooling fin or a water cooling type cooling plate.

That is, the battery module according to the present invention may be configured in an air cooling type structure or a water cooling type structure as needed without great change of processes. Consequently, various heat dissipation members having different structures may be easily applied to the battery module according to the present invention based on how heat is dissipated.

Also, in the battery module according to the present invention, it is possible to easily dispose heat dissipation members different from the plate-shaped heat dissipation member between the respective battery cartridges, thereby achieving effective heat dissipation by disposing a desired type of a heat dissipation member between the respective battery cartridges.

In a preferred example, the heat dissipation member may include a first heat dissipation member and a second heat dissipation member, the first heat dissipation member may extend such that one side of the first heat dissipation member covers at least a portion of an outermost battery cartridge (a) of the battery module, and the other side of the first heat dissipation member is disposed between the inner battery cartridges, and the second heat dissipation member may extend such that one side of the second heat dissipation member covers at least a portion of the outermost battery cartridge (a) of the battery module in a state in which the second heat dissipation member does not overlap with the first heat dissipation member, and the other side of the second heat dissipation member is disposed between the inner battery cartridges.

In the battery module with the above-stated construction, two or more heat dissipation members surround a plurality of battery cartridges such that the heat dissipation members do not overlap with each other in a state in which the heat dissipation members are in contact with at least one side of each of the battery cartridges, and at least a portion of each of the heat dissipation members is exposed to the outside of the outermost battery cartridge, and therefore, it is possible to effectively dissipate heat generated from the battery cartridges (specifically, the battery cells mounted in the battery cartridges) by heat conduction through the heat dissipation member.

Furthermore, the battery cartridges are stacked in a structure in which opposite sides of the respective battery cartridges are in tight contact with each other by the elastic pressing members in a state in which the heat dissipation members are mounted between the respective battery cartridges, thereby achieving easy heat transfer. Consequently, it is possible to more effectively cool the battery cells and/or to reduce temperature deviation between the battery cells. Also, it is possible to restrain the increase in size of the battery module including the heat dissipation members. In addition, it is possible to stack the battery cartridges with higher integration than battery cartridges using a conventional cooling system.

In the above description, the sentence "the second heat dissipation member is mounted at the battery module in a state in which the second heat dissipation member does not overlap with the first heat dissipation member" means that these heat dissipation members are mounted at the battery module in state in which the heat dissipation members do not overlap with each other while the heat dissipation members satisfy the above conditions. Consequently, the first heat dissipation member and the second heat dissipation member are mounted at the battery module such that the first heat dissipation member and the second heat dissipation member are opposite to each other.

The heat dissipation members may be mounted at the battery module in a state in which the heat dissipation members are bent to cover sides of the battery cartridges. For example, each of the heat dissipation members may be bent in a '[' shape.

That is, in the battery module using the battery cartridges according to the present invention, the heat dissipation members may have the above-described mounting structure. The heat dissipation members may have a mounting structure flexible according to a desired shape by elastic compressive force of the elastic pressing members although the heat dissipation members are bent according to the shape and stack thickness of the battery cartridges.

In a preferred example, the first heat dissipation member may be configured such that one side of the first heat dissipation member covers an area equivalent to ⅓ to ½ of the area of the outside of the outermost battery cartridge (a), and the second heat dissipation member may be configured such that one side of the second heat dissipation member covers an area equivalent to ⅓ to ½ of the area of the outside of the outermost battery cartridge (a) at the opposite side of the first heat dissipation member. Consequently, one side of the first heat dissipation member and one side of the second heat dissipation member, which are opposite to each other, covers an area equivalent to the entirety or ⅔ of the area of the outside of the outermost battery cartridge. If the area of the outside of the outermost battery cartridge covered by the first and second heat dissipation members is less than ⅔ of the area of the outside of the outermost battery cartridge, it is difficult to achieve a heat dissipation effect. Therefore, it is preferable for the first and second heat dissipation members to cover ⅔ or more of the area of the outside of the outermost battery cartridge.

In this aspect, it is more preferable for one end of the first heat dissipation member to cover an area equivalent to ½ of the area of the outside of the outermost battery cartridge (a) and for one end of the second heat dissipation member to cover an area equivalent to ½ of the area of the outside of the outermost battery cartridge (a). Alternatively, one end of the first heat dissipation member may cover an area equivalent to ⅔ of the area of the outside of the outermost battery cartridge (a), and one end of the second heat dissipation member may cover an area equivalent to ⅓ of the area of the outside of the outermost battery cartridge (a).

Meanwhile, the other side of each of the first and second heat dissipation members disposed between the battery cartridges may extend such that the other side of each of the first and second heat dissipation members is disposed throughout the interface between the battery cartridges. That is, the other side of each of the first and second heat dissipation members disposed between the battery cartridges covers the entirety of the interface between the stacked battery cartridges, thereby effectively dissipating heat generated from the respective battery cartridges through conduction.

In a preferred example, the heat dissipation members may be mounted at the battery module such that the other side of each of the heat dissipation members is located at only one side of each of the battery cartridges. Even in a case in which each of the heat dissipation members is located at only one side of each of the battery cartridges, it is possible to achieve desired heat transfer through conduction, thereby easily removing heat generated from the battery cartridges.

Specifically, on the assumption that the battery cartridges stacked on the basis of the outermost battery cartridge (a) are sequentially referred to as a first battery cartridge, a second battery cartridge, a third battery cartridge, . . . , a $p^{th}$ battery cartridge, the other side of the first heat dissipation member may be disposed between the first battery cartridge and the second battery cartridge, and the other side of the second heat dissipation member may be disposed between the third battery cartridge and the fourth battery cartridge.

Therefore, even in a case in which the other side of each of the first and second heat dissipation members is not disposed between the second battery cartridge and the third battery cartridge, one side of the second battery cartridge is in contact with the first heat dissipation member disposed between the first battery cartridge and the second battery cartridge, thereby achieving heat dissipation, and one side of the third battery cartridge is in contact with the second heat dissipation member disposed between the third battery cartridge and the fourth battery cartridge, thereby achieving heat dissipation.

According to circumstances, the other side of the second heat dissipation member may be disposed between the second battery cartridge and the third battery cartridge in consideration of the fact that an amount of heat generated from the battery cartridges located at the middle region of the battery module. Consequently, one side of the second battery cartridge is brought into contact with the first heat dissipation member, and the other side of the second battery cartridge is brought into contact with the second heat dissipation member, thereby achieving a high heat dissipation effect through the two heat dissipation members.

In a preferred example, the heat dissipation member may further include a third heat dissipation member and a fourth heat dissipation member mounted to another outermost battery cartridge (b) of the battery module, the third heat dissipation member may extend such that one side of the third heat dissipation member covers at least a portion of the outermost battery cartridge (b) of the battery module, and the other side of the third heat dissipation member is disposed between the inner battery cartridges, and the fourth heat dissipation member may extend such that one side of the fourth heat dissipation member covers at least a portion of the outermost battery cartridge (b) of the battery module in a state in which the fourth heat dissipation member does not overlap with the third heat dissipation member, and the other side of the second heat dissipation member is disposed between the inner battery cartridges.

The outermost battery cartridge (b) is a battery cartridge opposite to the outermost battery cartridge (a) in the battery module including the plurality of stacked battery cartridges. That is, the outermost battery cartridge (a) and the outermost battery cartridge (b) are located at the opposite sides of the battery module. In the above preferred example, therefore, the third and fourth heat dissipation members may be mounted at the outermost battery cartridge (b) in the same manner as or in a similar manner to the first and second heat dissipation members of the outermost battery cartridge (a).

In the above structure, the third heat dissipation member and the fourth heat dissipation member may be mounted at the battery module at positions at which the third heat dissipation member and the fourth third heat dissipation member do not overlap with the first heat dissipation member and the second heat dissipation member.

The third heat dissipation member and the fourth third heat dissipation member may be mounted as follows. For example, on the assumption that the battery cartridges stacked on the basis of the outermost battery cartridge (b) are sequentially referred to as an $n^{th}$ battery cartridge, an $n-1^{th}$ battery cartridge, an $n-2^{th}$ battery cartridge, . . . , a $p^{th}$ battery cartridge, the other side of the third heat dissipation member may be disposed between the $n^{th}$ battery cartridge and the $n-1^{th}$ battery cartridge, and the other side of the fourth heat dissipation member may be disposed between the $n-2^{th}$ battery cartridge and the $n-3^{th}$ battery cartridge.

Consequently, a desired number of the battery cartridges may be stacked in a structure in which the battery cartridges are covered by a plurality of heat dissipation members without overlapping, thereby achieving a battery module having high power and large capacity without an additional coolant flow channel as compared with a conventional art.

According to circumstances, an insulative member may be mounted between the outside of the outermost battery cartridge (a) and the heat dissipation members so as to prevent the outermost battery cartridge (a) from being overcooled. Such an insulative member may be mounted between the outside of the outermost battery cartridge (b) and the heat dissipation members so as to prevent the outermost battery cartridge (b) from being overcooled, in the same manner as in the outermost battery cartridge (a). The outermost battery cartridge (a) and the outermost battery cartridge (b) are directly exposed to the external environment through the heat dissipation members, with the result that the outermost battery cartridge (a) and the outermost battery cartridge (b) have a greater cooling rate than the internal stacked battery cartridges. Consequently, heat generated from the outermost battery cartridges is also dissipated through the heat dissipation members by the provision of such an insulative member, thereby reducing a temperature deviation between the respective battery cartridges.

The battery module is not particularly restricted as long as a plurality of battery cartridges are stacked in a state in which the heat dissipation members are disposed between the respective battery cartridges to constitute the battery module. For example, the battery module may include a total of 6 to 12 battery cartridges. Even in a structure in which the battery cartridges are stacked, a coolant flow channel for cooling may be configured to pass along the heat dissipation members, and therefore, it is possible to substantially reduce the number of coolant flow channels. For example, the coolant flow channels may be configured to pass along only the heat dissipation member regions on the outermost battery cartridges. Alternatively, the coolant flow channels may be configured to pass along the heat dissipation member regions on the outermost battery cartridges and heat dissipation member regions at the top and/or bottom of the battery module. Consequently, the battery module according to the present invention may be configured in a thermally stable structure without a plurality of coolant flow channels.

In the battery module according to the present invention as described above, it is possible to dispose various kinds of heat dissipation members between the battery cartridges to which the elastic pressing members are mounted, thereby providing a desired cooling structure as needed.

Also, the battery module according to the present invention is preferably used a power source for devices which require high power and large capacity and to which various kinds of external force, such as vibration and impact, are applied, e.g., as a power source for electric vehicles, hybrid electric vehicles, or plug-in hybrid electric vehicles.

Advantageous Effects

As is apparent from the above description, the battery cartridge according to the present invention is configured in a structure in which the outer circumference of the battery cell is fixed by the plate-shaped frames in a state in which the sides of the battery cell are open, the elastic pressing members are mounted at outsides of the frames, and the heat dissipation members are disposed between the respective battery cartridges, so as to constitute a battery module. Consequently, it is possible to use various kinds of cooling methods and to manufacture a battery module which is configured generally in a compact structure and which is flexible in design change of the battery module.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
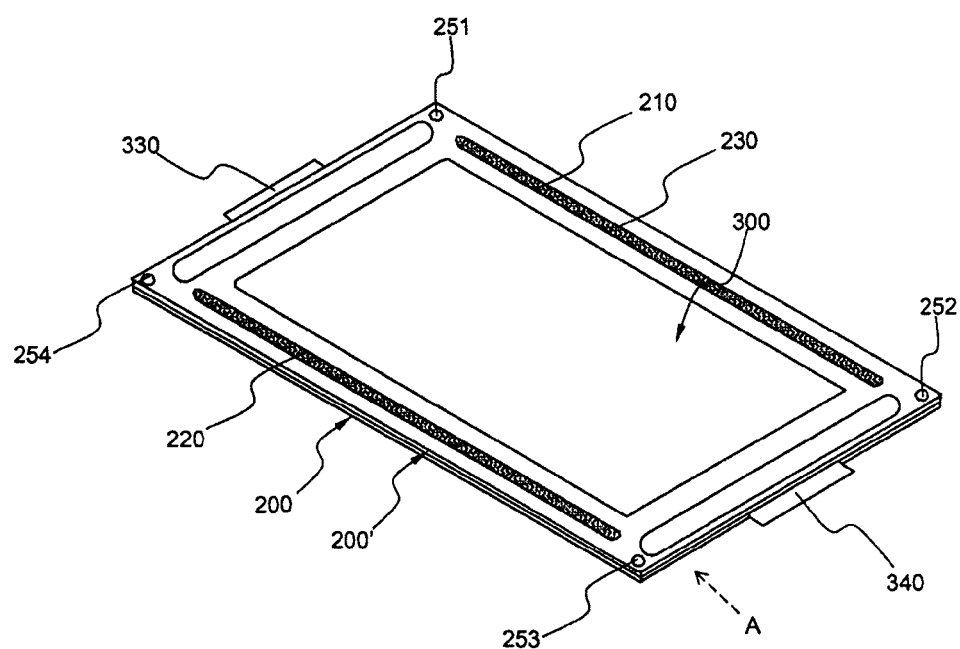
FIG. 1 is a plan view typically illustrating a battery cartridge according to an embodiment of the present invention.
Figure 2:
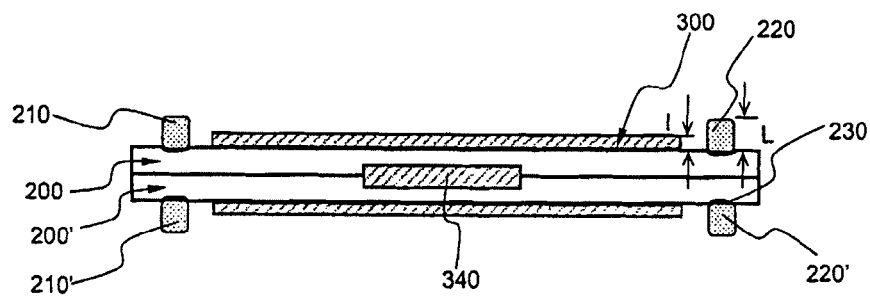
FIG. 2 is a vertical sectional view illustrating the battery cartridge of FIG. 1.

FIG. 1 is a plan view typically illustrating a battery cartridge according to an embodiment of the present invention, and FIG. 2 is a vertical sectional view typically illustrating the battery cartridge when viewed in a direction A of FIG. 1.

Referring to these drawings, a battery cartridge 100 is configured in a structure in which a plate-shaped battery cell 300 is mounted in the battery cartridge 100, and a cathode terminal 330 and an anode terminal 340 of the battery cell 300 protrude outward from the battery cartridge 100.

The battery cartridge 100 includes a pair of plate-shaped frames 200 and 200' configured to fix opposite sides of the battery cell 300 at the outer circumference thereof in a state in which the opposite sides of the battery cell 300 are open. The respective frames 200 and 200' are provided at left and right side parts of the outsides thereof with elastic pressing members 210, 220, 210', and 220', which extend in the longitudinal direction of the respective frames 200 and 200'.

Also, the battery cell 300 is mounted between the respective frames 200 and 200' in a state in which the open sides of the battery cell 300 protrude from the respective frames 200 and 200'. The elastic pressing members 210, 220, 210', and 220' are mounted at the outsides of the respective frames 200 and 200' in a state in which the elastic pressing members 210, 220, 210', and 220' have a height L greater than a protruding height l of the battery cell 300 at the open sides thereof. Consequently, when a plurality of battery cartridges 100 in each of which the battery cell 300 is mounted are stacked in a state in which heat dissipation members (not shown) are disposed respectively between the battery cartridges 100, the elastic pressing members 210, 220, 210', and 220' apply elastic compressive force to the heat dissipation members (not shown) when the elastic pressing members 210, 220, 210', and 220' are pressed. As a result, the heat dissipation members (not shown) are stably mounted between the respective battery cartridges while the size of a battery module constituted by the battery cartridges 100 is not increased by the provision of the elastic pressing members 210, 220, 210', and 220'.

Figure 3:
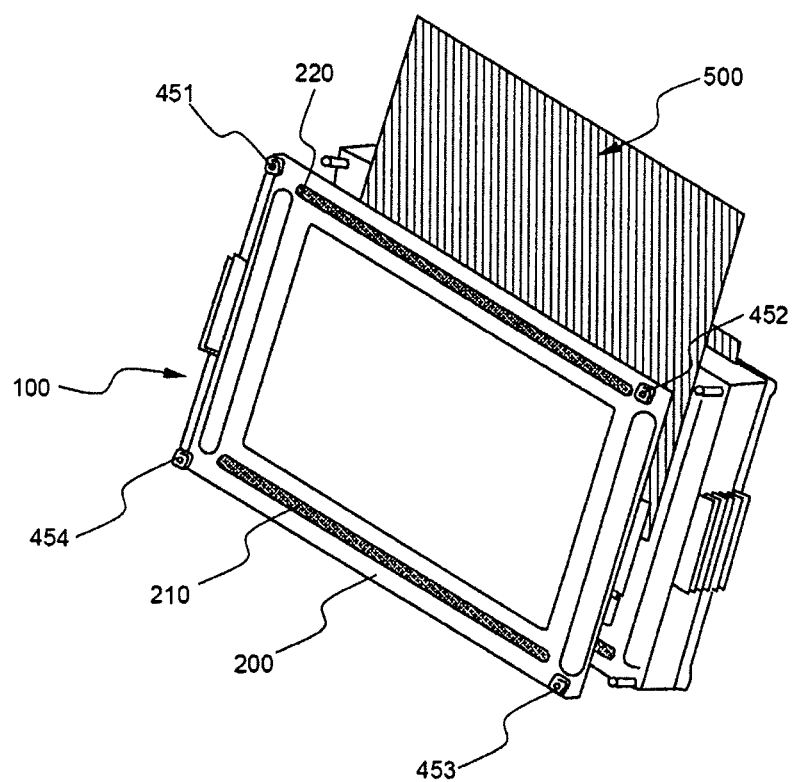
FIG. 3 is a perspective view illustrating a battery module configured in a structure in which heat dissipation members are disposed respectively between battery cartridges, one of which is shown in FIG. 1.

FIG. 3 is a perspective view typically illustrating a battery module 400 configured in a structure in which heat dissipation members 500 are disposed respectively between battery cartridges 100, one of which is shown in FIG. 1, as described above.

Referring to FIG. 3, each of the heat dissipation members 500 is formed in the shape of a plate. Each of the heat dissipation members 500 may be implemented by an air cooling type cooling fin. The heat dissipation members 500 are disposed between the respective battery cartridges 100. The battery cartridges 100 may be disposed at all of the interfaces between the respective battery cartridges 100. Alternatively, the battery cartridges 100 may be disposed at some of the interfaces between the respective battery cartridges 100.

The battery module 400 is manufactured by stacking the battery cartridges 100 in a state in which the heat dissipation members 500 are disposed between the respective battery cartridges 100 and inserting coupling members 451, 452, 453, and 454 through coupling through holes (not shown) formed in the respective battery cartridges 100.

The elastic pressing members 210, 220, 210', and 220' mounted at the outsides of the frames 200 of the respective battery cartridges 100 assist the heat dissipation members 500 to be stably mounted and fixed to the corresponding frames 200.

Figure 4:
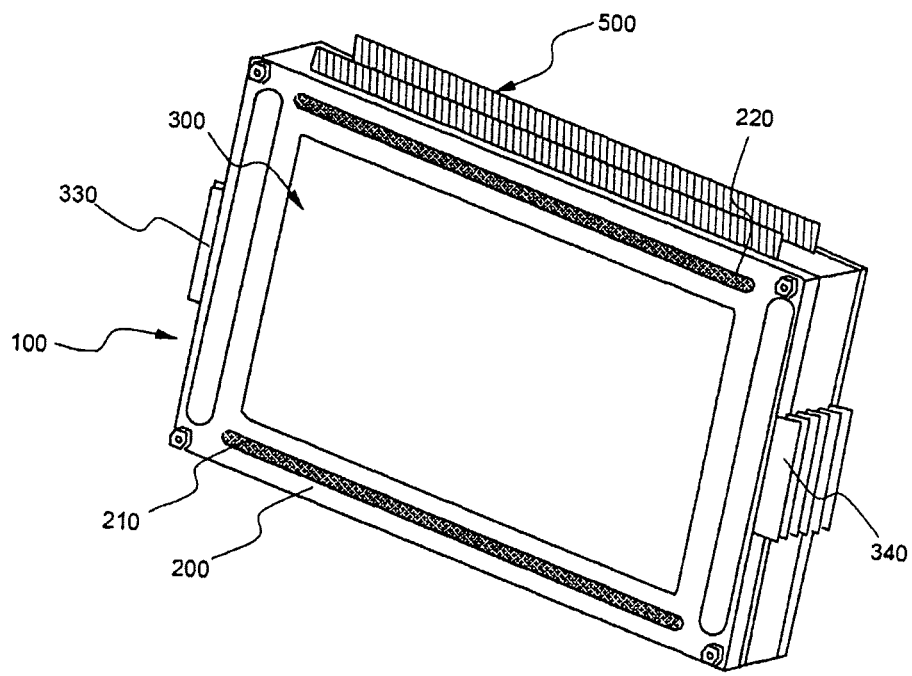
FIG. 4 is a perspective view illustrating a battery module manufactured by stacking a plurality of battery cartridges, one of which is shown in FIG. 1.

FIG. 4 is a perspective view typically illustrating a battery module manufactured by stacking a plurality of battery cartridges, one of which is shown in FIG. 1.

Each of the heat dissipation members 500 is partially exposed outward from the corresponding battery cartridges, with the result that heat generated from the battery cells 300 during charge and discharge of the battery cells 300 is transferred to the heat dissipation members 500 disposed between the respective battery cartridges 100 and is then discharged to the outside, thereby achieving high heat dissipation efficiency. Consequently, it is possible to apply various heat dissipation methods with respect to the battery module 400 by the provision of the structure in which the elastic pressing members 210, 220, 210', and 220' are mounted at the outsides of the frames 200 of the respective battery cartridges 100 according to the present invention.

Figure 5:
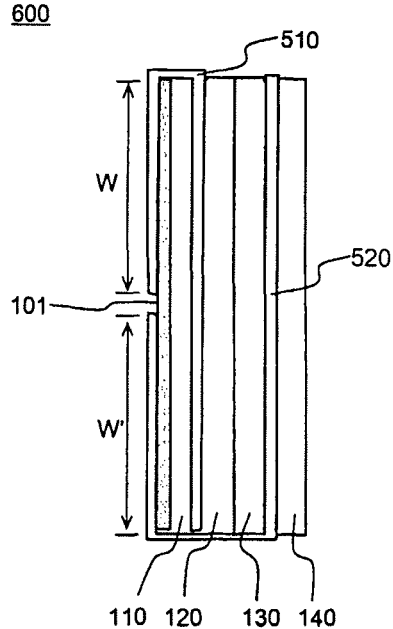
FIG. 5 is a partial front view illustrating a battery module according to an embodiment of the present invention.

FIG. 5 is a partial front view typically illustrating a battery module according to an embodiment of the present invention. For convenience of description, the battery cartridges are simply shown with various members, such as electrode terminals and elastic pressing members, constituting the battery module being omitted.

Referring to FIG. 5, a battery module 600 is configured in a structure in which four battery cartridges 110, 120, 130, and 140 are stacked in a state in which the battery cartridges 110, 120, 130, and 140 are adjacent to one another, and two heat dissipation members 510 and 520 are mounted at predetermined positions of the battery module 600.

The first heat dissipation member 510 is configured such that one side of the first heat dissipation member 510 covers an area W equivalent to approximately half an area of the outside of the first battery cartridge 110, and the second heat dissipation member 520 is configured such that one side of the second heat dissipation member 520 covers an area W' equivalent to approximately half an area of the outside of the first battery cartridge 110 at the opposite side of the first heat dissipation member 510. As a result, the outside of the first battery cartridge 110, which is an outermost one of the battery cartridges, is substantially entirely covered by the first heat dissipation member 510 and the second heat dissipation member 520.

The first heat dissipation member 510 is bent such that the other side of the first heat dissipation member 510 is disposed between the first battery cartridge 110 and the second battery cartridge 120, and the second heat dissipation member 520 is also bent such that the other side of the second heat dissipation member 520 is disposed between the third battery cartridge 130 and the fourth battery cartridge 140. The other side of the second heat dissipation member 520 extends such that the other side of the second heat dissipation member 520 is disposed throughout the interface between the third battery cartridge 130 and the fourth battery cartridge 140.

As a result, the first heat dissipation member 510 and the second heat dissipation member 520 are mounted at the battery module 600 in a state in which the first heat dissipation member 510 and the second heat dissipation member 520 do not overlap with each other.

Also, an insulative member 101 is mounted between the outside of the first battery cartridge 110 and the first and second heat dissipation members 510 and 520 so as to prevent the first battery cartridge 110 from being overcooled.

Figure 6:
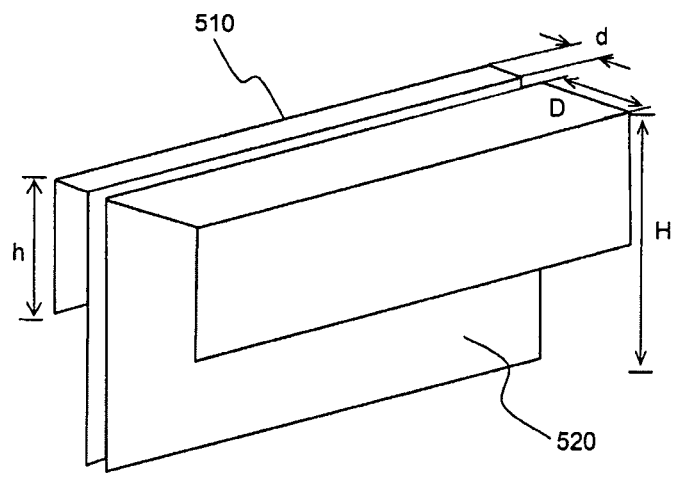
FIG. 6 is a perspective view illustrating heat dissipation members shown in FIG. 5.

FIG. 6 is a perspective view typically illustrating the heat dissipation members shown in FIG. 5. For comparison, the heat dissipation members are shown as being disposed in the same arrangement structure, which is different from the structure in which the heat dissipation members are mounted at the battery module of FIG. 5.

Referring to FIG. 6, the heat dissipation members 510 and 520 are made of metal bendable plate-shaped materials exhibiting high thermal conductivity. Each of the heat dissipation members 510 and 520 is bent in a '[' shape to cover sides of the respective battery cartridges (not shown).

Specifically, one side of each of the heat dissipation members 510 and 520 has a relatively short length h such that one side of each of the heat dissipation members 510 and 520 partially covers the outside of the outermost battery cartridge (not shown), and the other side of each of the heat dissipation members 510 and 520 has a relatively long length H such that the other side of each of the heat dissipation members 510 and 520 is disposed throughout the interface between the corresponding battery cartridges.

Meanwhile, the second heat dissipation member 520 has a bending width D greater than a bending width d of the first heat dissipation member 510. This is because the other side of the first heat dissipation member 510 is disposed between the first battery cartridge 110 and the second battery cartridge 120 as shown in FIG. 5, and therefore, the bending width d of the first heat dissipation member 510 corresponds to the sum of the thickness of the insulative member 101 and the thickness of the first battery cartridge 110; the other side of the second heat dissipation member 520 is disposed between the third battery cartridge 130 and the fourth battery cartridge 140 as shown in FIG. 5, and therefore, the bending width D of the second heat dissipation member 520 corresponds to the sum of the thickness of the insulative member 101, the thickness of the first battery cartridge 110, the thickness of the second battery cartridge 120, and the thickness of the third battery cartridge 130.

Figure 7:
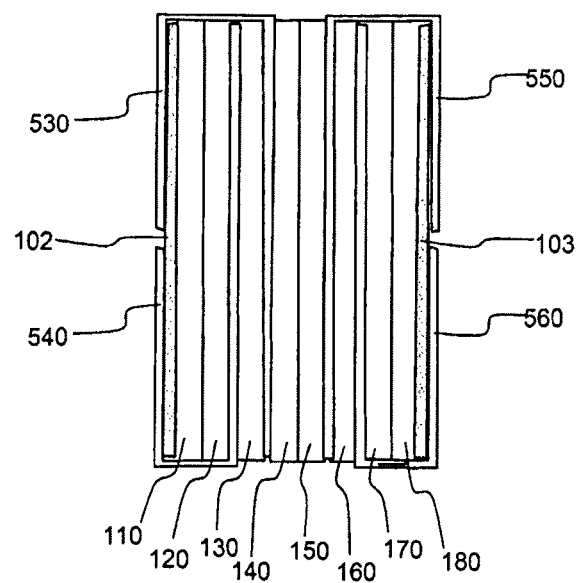
FIG. 7 is a front view illustrating a battery module according to another embodiment of the present invention.
Figure 8:
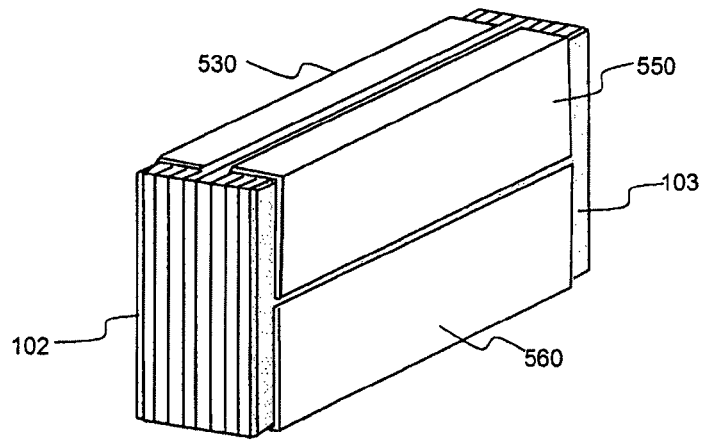
FIG. 8 is a perspective view illustrating the battery module of FIG. 7.

FIG. 7 is a front view typically illustrating a battery module according to another embodiment of the present invention, and FIG. 8 is a perspective view typically illustrating the battery module of FIG. 7.

Referring to these drawings, a battery module 700 is configured in a structure in which eight battery cartridges are stacked in a state in which sides of the respective battery cartridges are in tight contact with corresponding sides of the neighboring battery cartridges without air gaps, and four heat dissipation members are mounted at the battery module 700.

The first heat dissipation member 530 and the second heat dissipation member 540 are configured such that one side of each of the first and second heat dissipation members 530 and 540 covers an area equivalent to approximately half the area of the outside of the first battery cartridge 110, which is an outermost one of the battery cartridges, and the third heat dissipation member 550 and the fourth heat dissipation member 560 are configured such that one side of each of the third and fourth heat dissipation members 550 and 560 covers an area equivalent to approximately half the area of the outside of the eighth battery cartridge 180, which is another outermost one of the battery cartridges.

The first heat dissipation member 530 is bent such that the other side of the first heat dissipation member 530 is disposed between the third battery cartridge 130 and the fourth battery cartridge 140, and the second heat dissipation member 540 is bent such that the other side of the second heat dissipation member 540 is disposed between the second battery cartridge 120 and the third battery cartridge 130. Also, the third heat dissipation member 550 is bent such that the other side of the third heat dissipation member 550 is disposed between the fifth battery cartridge 150 and the sixth battery cartridge 160, and the fourth heat dissipation member 560 is bent such that the other side of the fourth heat dissipation member 560 is disposed between the sixth battery cartridge 160 and the seventh battery cartridge 170.

The battery cartridges 110, 120, 140, 150, 170, and 180 are configured such that one side of each of the battery cartridges 110, 120, 140, 150, 170, and 180 is in direct or indirect contact with a corresponding one of the heat dissipation members 530, 540, 550, and 560. On the other hand, the battery cartridges 130 and 160 are configured such that opposite sides of each of the battery cartridges 130 and 160 are in direct contact with corresponding ones of the heat dissipation members 530, 540, 550, and 560. However, the battery cartridges and the heat dissipation members may be arranged in various forms as long as the heat dissipation members can be brought into tight contact with the corresponding battery cartridges by the heat dissipation members (not shown). According to circumstances, the heat dissipation members may be provided at opposite sides of the battery cartridges located at the middle region of the battery module, at which heat accumulation may be serious, in a tight contact manner.

Also, insulative members 102 and 103 are mounted between the first battery cartridge 110 and the first heat dissipation member 530 and between the eighth battery cartridge 180 and the fourth heat dissipation member 560, respectively, so as to prevent the first battery cartridge 110 and the eighth battery cartridge 180 from being overcooled.

As a result, balanced dissipation of heat from the battery cartridges is achieved, thereby reducing overall temperature deviation.

Consequently, the battery module including the battery cartridges according to the present invention are configured in a structure in which the heat dissipation members are mounted between the battery cartridges in various manners, thereby achieving efficient heat dissipation.

Figure 9:
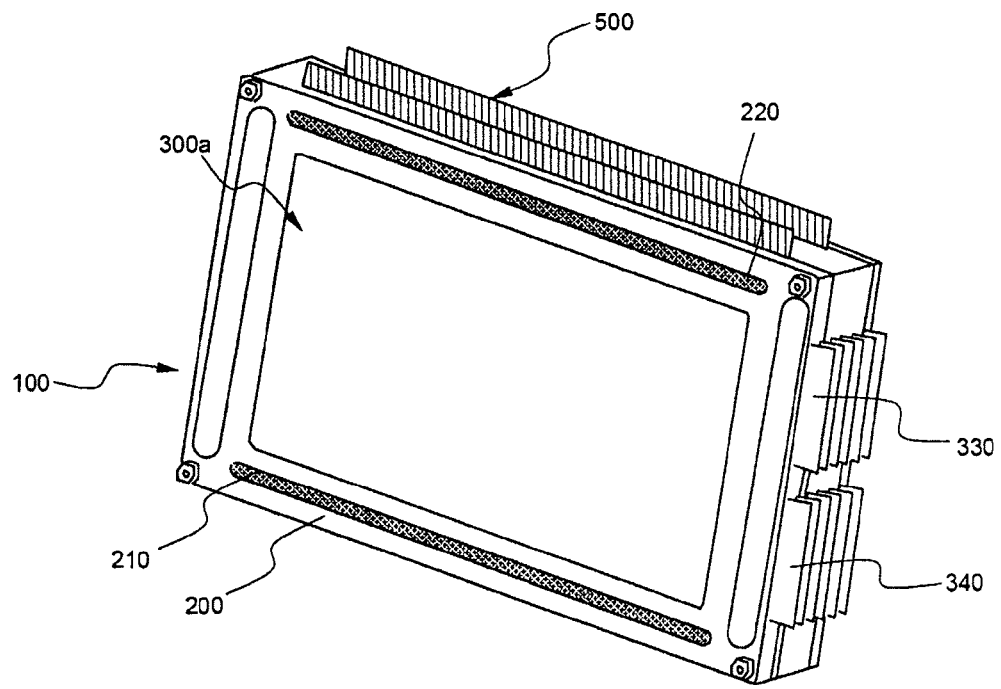
FIG. 9 is a perspective view illustrating a battery module according to a further embodiment of the present invention.

FIG. 9 is a perspective view illustrating a battery module according to a further embodiment of the present invention.

In a battery module 400a of FIG. 9, battery cells 300a are configured in a structure in which a cathode terminal 330 and an anode terminal 340 protrude upward from each of the battery cells 300a. Consequently, the battery cartridges 100 are applicable to the battery cells 300a configured in a structure in which the cathode terminal 330 and the anode terminal 340 protrude from each of the battery cells 300s in the same direction as well as the battery cells 300 configured in a structure in which the cathode terminal 330 and the anode terminal 340 protrude from each of the battery cells 300 in opposite directions as in the battery module 400 of FIG. 4.

The battery module 400a of FIG. 9 is identical in other structure to the battery module 400 of FIG. 4, and therefore, a detailed description thereof will not be given.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery cartridge configured in a frame structure to mount a plate-shaped battery cell therein, the battery cartridge comprising:
    a pair of plate-shaped frames configured to fix an outer circumference of the battery cell as a sealing portion in a state in which at least one side of the battery cell is open,
    wherein each of the frames is provided at an outside thereof with an elastic pressing member configured to fix a heat dissipation member to the open side of the battery cell in a tight contact manner upon manufacture of a battery module,
    wherein the elastic pressing member is mounted to at least one selected from a group consisting of an upper side region, a lower side region, a left side region, and a right side region of the outside of each of the frames
    wherein each of the frames is provided at the outside thereof with a groove, in which the elastic pressing member is mounted,
    wherein the battery cell is mounted between the respective frames in a state in which the at least one open side of the battery cell protrudes from a corresponding one of the frames, and the elastic pressing member is mounted at the outside of each of the frames in a state in which the elastic pressing member has a height greater than a protruding height of the battery cell at the at least one open side thereof,
    wherein the elastic pressing member is elastically pressed, when a plurality of battery cartridges, in each of which the battery cell is mounted, are stacked to constitute the battery module, and
    wherein the elastic pressing member is formed of a different material than the frames.

2. The battery cartridge according to claim 1, wherein the elastic pressing member is made of a polymer resin exhibiting high elastic compressive force when the elastic pressing member is pressed.

3. The battery cartridge according to claim 2, wherein the elastic pressing member is made of rubber.

4. The battery cartridge according to claim 1, wherein the elastic pressing member has a width equivalent to 10 to 80% of a width of each of the frames.

5. A battery module configured in a structure in which battery cartridges according to claim 1 are sequentially stacked in a state in which battery cells are mounted in the battery cartridges, and a heat dissipation member is disposed at least one interface between the battery cartridges.

6. The battery module according to claim 5, wherein the heat dissipation member is formed in the shape of a plate, and the heat dissipation member is disposed between the battery cartridges in a state in which at least a portion of the heat dissipation member is exposed outward from the stacked battery cartridges.

7. The battery module according to claim 5, wherein the heat dissipation member is an air cooling type cooling fin or a water cooling type cooling plate.

8. The battery module according to claim 5, wherein the heat dissipation member comprises a first heat dissipation member and a second heat dissipation member,
- wherein the first heat dissipation member extends such that one side of the first heat dissipation member covers at least a portion of an outermost battery cartridge (a) of the battery module, and the other side of the first heat dissipation member is disposed between the inner battery cartridges, and
- wherein the second heat dissipation member extends such that one side of the second heat dissipation member covers at least a portion of the outermost battery cartridge (a) of the battery module in a state in which the second heat dissipation member does not overlap with the first heat dissipation member, and the other side of the second heat dissipation member is disposed between the inner battery cartridges.

9. The battery module according to claim 8, wherein the heat dissipation members are mounted at the battery module in a state in which the heat dissipation members are bent to cover sides of the battery cartridges.

10. The battery module according to claim 8, wherein the first heat dissipation member is configured such that one side of the first heat dissipation member covers an area equivalent to ⅓ to ½ of an area of the outside of the outermost battery cartridge (a), and the second heat dissipation member is configured such that one side of the second heat dissipation member covers an area equivalent to ⅓ to ½ of an area of the outside of the outermost battery cartridge (a) at the opposite side of the first heat dissipation member.

11. The battery module according to claim 8, wherein the other side of each of the first and second heat dissipation members disposed between the battery cartridges extends such that the other side of each of the first and second heat dissipation members is disposed throughout an interface between the battery cartridges.

12. The battery module according to claim 8, wherein the heat dissipation members are mounted at the battery module such that the other side of each of the heat dissipation members is located at one side of each of the plate-shaped battery cartridges.

13. The battery module according to claim 8, wherein, the outermost battery cartridge (a) is a first battery cartridge and the inner battery cartridges include at least a second battery cartridge, a third battery cartridge, and a fourth battery cartridge, the other side of the first heat dissipation member is disposed between the first battery cartridge and the second battery cartridge, and the other side of the second heat dissipation member is disposed between the third battery cartridge and the fourth battery cartridge.

14. The battery module according to claim 8, wherein the heat dissipation member further comprises a third heat dissipation member and a fourth heat dissipation member mounted to another outermost battery cartridge (b) of the battery module,
- wherein the third heat dissipation member extends such that one side of the third heat dissipation member covers at least a portion of the outermost battery cartridge (b) of the battery module, and the other side of the third heat dissipation member is disposed between the inner battery cartridges, and
- wherein the fourth heat dissipation member extends such that one side of the fourth heat dissipation member covers at least a portion of the outermost battery cartridge (b) of the battery module in a state in which the fourth heat dissipation member does not overlap with the third heat dissipation member, and the other side of the second heat dissipation member is disposed between the inner battery cartridges.

15. The battery module according to claim 14, wherein the third heat dissipation member and the fourth heat dissipation member are mounted at the battery module at positions at which the third heat dissipation member and the fourth third heat dissipation member do not overlap with the first heat dissipation member and the second heat dissipation member.

16. The battery module according to claim 14, wherein the outermost battery cartridge is an nth battery cartridge and the inner battery cartridges includes at least an n−1th battery cartridge, an n−2th battery cartridge, and a n−3th battery cartridge, the other side of the third heat dissipation member is disposed between the nth battery cartridge and the n−1th battery cartridge, and the other side of the fourth heat dissipation member is disposed between the n−2th battery cartridge and the n−3th battery cartridge.

17. The battery module according to claim 8, wherein an insulative member is mounted between the outside of the outermost battery cartridge (a) and the heat dissipation members so as to prevent the outermost battery cartridge (a) from being overcooled.

18. The battery module according to claim 8, wherein the battery module comprises a total of 6 to 12 battery cartridges.

19. The battery cartridge according to claim 1, wherein the frames are made of an insulative material or a material upon which insulative surface treatment is carried out.

20. The battery cartridge according to claim 1, wherein the elastic pressing member is retained in a groove spaced from an edge of the frame.

21. The battery cartridge according to claim 1, wherein the battery cell protrudes from a surface of the frame by a first height, and
- wherein the elastic pressing member protrudes from a surface of the frame by a second height, the second height being greater than the first height.

* * * * *